F. A. HOLECNY.
LICENSE NUMBER PLATE HOLDER.
APPLICATION FILED NOV. 13, 1916.
1,245,461.
Patented Nov. 6, 1917.
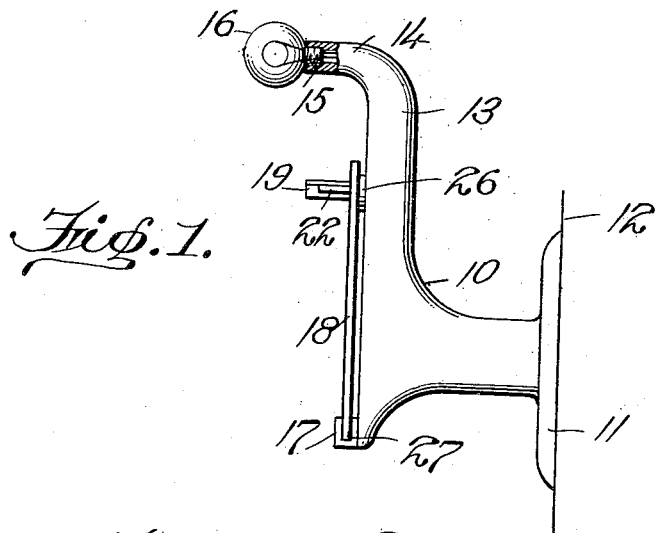
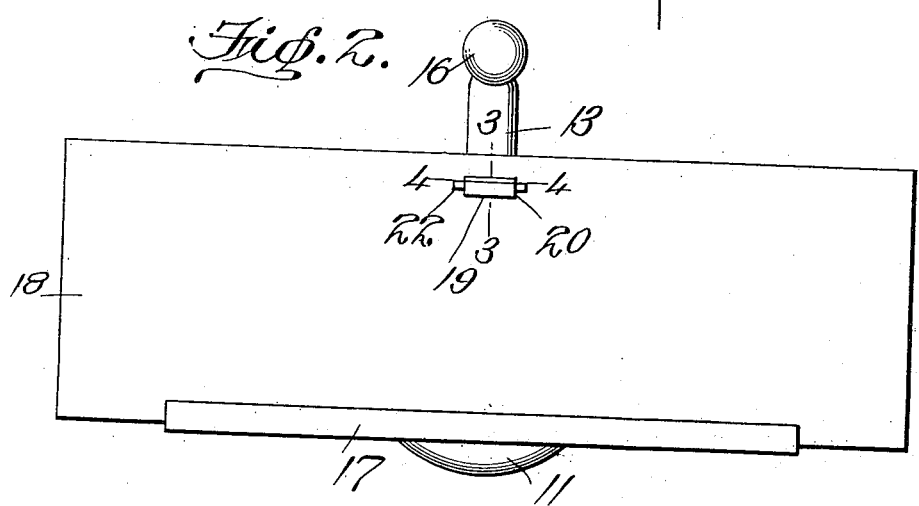
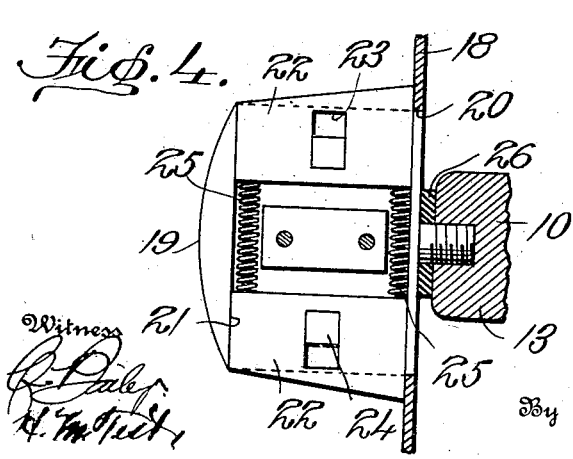
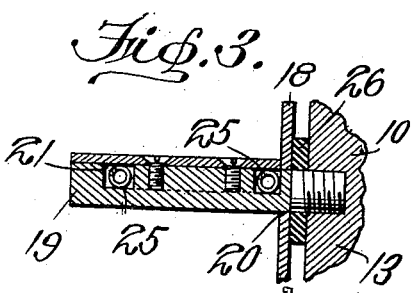
Inventor
F. A. Holecny,

UNITED STATES PATENT OFFICE.

FRED A. HOLECNY, OF LIMA, OHIO.

LICENSE-NUMBER-PLATE HOLDER.

1,245,461.  Specification of Letters Patent.  Patented Nov. 6, 1917.

Application filed November 13, 1916. Serial No. 131,027.

*To all whom it may concern:*

Be it known that I, FRED A. HOLECNY, a citizen of the United States, residing at Lima, in the county of Allen, State of Ohio, have invented certain new and useful Improvements in License-Number-Plate Holders; and I do hereby declare the following to be a full, clear, and exact description of the invention, such as will enable others skilled in the art to which it appertains to make and use the same.

This invention relates to improvements in license holders and lamp brackets for automobiles.

One object of the present invention is to provide a simple device of this character which will effectively hold a license plate in proper position at the rear of the automobile, so that it can be readily seen.

Another object is to provide a device of this character whereby a license plate can be easily and quickly applied or removed, and from which there will be no danger of the plate getting loose or dropping off.

Other objects and advantages will be apparent from the following description when taken in connection with the accompanying drawing.

In the drawing:

Figure 1 is a side elevation of a license number plate holder made in accordance with my invention.

Fig. 2 is a front elevation of the same.

Fig. 3 is an enlarged vertical sectional view taken on the line 3—3 of Fig. 2.

Fig. 4 is an enlarged horizontal sectional view taken on the line 4—4 of Fig. 2.

Referring particularly to the accompanying drawing, 10 represents, as a whole a bracket, which is provided with an attaching flange 11, for securing the bracket to the rear of the body of an automobile 12. The outer end of the arm of the bracket is formed with a vertical member 13, the upper end of which is directed rearwardly at right angles to the vertical member, as shown at 14. In this portion 14 there is formed a threaded socket 15 for the reception of the threaded stem of the electric lamp 16. The lower portion of the vertical member extends below the arm of the bracket, and is formed with a transversely extending member 17, in the upper face of which is formed a longitudinally extending groove for the reception of the lower edge of the license number plate 18. Extending outwardly from the upper portion of the vertical member, and below the out-turned upper end thereof, is a pin 19 which is arranged to be received through the elongated slot 20 in the upper portion of the plate 18. Formed transversely through this pin is a slot 21, and slidable in the slot are two plates 22, the outer edges of which are arranged to normally project through the sides of the pin. Formed transversely of each of the plates 22, and centrally thereof, is a slot 23, and through this slot, and carried by the pin, is a pin 24, for limiting the outward movement of the plates. Between the plates, and within the slot, are two coil springs 25, which normally force the plates outward so that their projecting edges engage with the face of the plate 18, at each end of the slot 20. When the upper end of the plate 18 is pressed into position to permit the entrance of the pin 19 through the slot 20, the projecting edges of the plates 22 will be pressed inwardly and permit the passage of the pin 19 through the slot. The plates 22 will then snap outwardly and engage with the face of the plate 18 so that said plate will be firmly held in position.

On the base of the pin 19 is disposed a rubber washer 26 which prevents rattling of the plate 18.

The lamp is so disposed that its light will fall on the plate 18, and permit the number thereof to be readily seen.

To remove the license number plate, it is only necessary to press the plates 22 inward, and withdraw the plate from the pin, and then by lifting the lower edge thereof from the groove of the member 17, said groove being represented at 27.

What is claimed is:

1. A license number plate holder comprising a bracket, a grooved member on the bracket for receiving the lower edge of the plate, a pin on the upper portion of the bracket for reception through the upper portion of the plate, and resiliently urged detents carried by the pin and extending laterally therefrom for passage through the plate and into engagement with the outer face of the latter to hold the plate from movement.

2. A license number plate holder comprising a bracket, a license number plate, a transverse grooved member on the lower portion of the bracket for supporting the lower edge of the plate, a projecting pin carried by the upper portion of the bracket, the upper portion of the plate being provided with an opening for the reception of said pin, and spring pressed members carried by the pin and engageable with the plate adjacent the opening.

In testimony whereof, I affix my signature, in the presence of two witnesses.

FRED A. HOLECNY.

Witnesses:
C. J. BREWERTON,
E. M. BOTKIN.

Copies of this patent may be obtained for five cents each, by addressing the "Commissioner of Patents, Washington, D. C."